US009026751B2

(12) United States Patent
Irisawa et al.

(10) Patent No.: US 9,026,751 B2
(45) Date of Patent: May 5, 2015

(54) MANAGEMENT COMPUTER USED TO CONSTRUCT BACKUP CONFIGURATION OF APPLICATION DATA

(75) Inventors: Misako Irisawa, Kawasaki (JP); Nobuhiro Maki, Yokohama (JP); Masayasu Asano, Yokohama (JP); Wataru Okada, Machida (JP)

(73) Assignee: Hitachi, Ltd., Tokyo (JP)

( * ) Notice: Subject to any disclaimer, the term of this patent is extended or adjusted under 35 U.S.C. 154(b) by 1243 days.

(21) Appl. No.: 12/339,237

(22) Filed: Dec. 19, 2008

(65) Prior Publication Data
US 2010/0082925 A1 Apr. 1, 2010

(30) Foreign Application Priority Data
Sep. 29, 2008 (JP) ................. 2008-251347

(51) Int. Cl.
*G06F 12/16* (2006.01)
*G06F 11/14* (2006.01)
*G06F 3/06* (2006.01)

(52) U.S. Cl.
CPC ........ *G06F 11/1466* (2013.01); *G06F 11/1458* (2013.01); *G06F 3/0605* (2013.01); *G06F 3/0631* (2013.01); *G06F 3/067* (2013.01); *G06F 11/1461* (2013.01); *G06F 11/1469* (2013.01); *G06F 11/1448* (2013.01); *G06F 11/1456* (2013.01)

(58) Field of Classification Search
CPC .................... G06F 11/1446–11/1469
See application file for complete search history.

(56) References Cited

U.S. PATENT DOCUMENTS

| 6,922,763 | B2 * | 7/2005 | Suzuki et al. ................. 711/162 |
| 2004/0225697 | A1 | 11/2004 | Asano et al. |
| 2007/0028239 | A1 * | 2/2007 | Dyck et al. ........................ 718/1 |
| 2007/0198790 | A1 * | 8/2007 | Asano et al. .................. 711/162 |
| 2007/0245106 | A1 | 10/2007 | Maki et al. |
| 2007/0266211 | A1 * | 11/2007 | Hiraiwa et al. ............... 711/162 |
| 2008/0059556 | A1 * | 3/2008 | Greenspan et al. ........... 709/201 |
| 2008/0077758 | A1 * | 3/2008 | Ohmido ....................... 711/162 |
| 2008/0091898 | A1 | 4/2008 | Takahashi et al. |
| 2008/0092053 | A1 | 4/2008 | Fujibayashi |
| 2008/0294859 | A1 * | 11/2008 | Nguyen ....................... 711/162 |

FOREIGN PATENT DOCUMENTS

JP 2005-011311 1/2005

* cited by examiner

*Primary Examiner* — Brian Peugh
*Assistant Examiner* — Nicholas Simonetti
(74) *Attorney, Agent, or Firm* — Brundidge & Stanger, P.C.

(57) ABSTRACT

According to the present invention, it is possible to construct a backup configuration of a particular application data, without influencing data of another application. A management computer is coupled to a host computer on which an application operates, and to a storage apparatus that includes a plurality of volume groups each having one or more logical volumes. At least one of the logical volumes is allocated to the application. The management computer includes a volume group overlapping use determination part and a backup policy determination part. When the backup of the volume group to which one logical volume belongs is configured, the volume group overlapping use determination part determines whether there is another application that uses the volume group. The backup policy determination part determines whether there is set, for another volume group, backup policy information same as that set for the application.

15 Claims, 17 Drawing Sheets

BACKUP POLICY TABLE

| VOLUME GROUP ID | COPY TYPE | PAIR ID | BACKUP SCHEDULE |
|---|---|---|---|
| VG_01 | — | — | — |
| VG_02 | LOCAL COPY | PAIR_01 | EVERY DAY 12:00 |
|  |  | PAIR_02 | EVERY DAY 12:00 |
| VG_03 | REMOTE COPY | PAIR_03 | EVERY DAY 12:00 |
|  | LOCAL COPY | PAIR_04 | SUNDAY 12:00 |
| ... | ... | ... | ... |

FIG. 4

BACKUP CATALOG TABLE

| BACKUP ID | DATE AND TIME | PAIR ID |
|---|---|---|
| BK_001 | JULY 1, 2008 12:00:00 | PAIR_01 |
| BK_002 | JULY 2, 2008 12:00:00 | PAIR_02 |
| BK_003 | JULY 3, 2008 12:00:00 | PAIR_01<br>PAIR_03 |
| ... | ... | ... |

FIG. 5

APPLICATION ADMINISTRATOR TABLE

| APPLICATION ADMINISTRATOR ID | HOST ID | APPLICATION ID | MANAGEABLE STORAGE DEVICE ID |
|---|---|---|---|
| P_01 | H_001 | AP_01 | ST_01 |
| P_02 | H_001 | AP_02 | ST_01 ST_02 |
| P_03 | H_001 | AP_03 | ST_01 |
| P_04 | H_001 | AP_04 | ST_01 ST_02 |
| ... | | ... | ... |

FIG. 6

APPLICATION CONFIGURATION TABLE

| APPLICATION ID | LOGICAL VOLUME ID | USED FILE ID |
|---|---|---|
| AP_01 | LV_01 | F_01 |
| AP_02 | LV_02 | F_02 |
| AP_03 | LV_03 | F_03 |
| AP_04 | LV_04 | F_04 |
| ... | ... | ... |

FIG. 7

LVM CONFIGURATION TABLE

138

610: LVM LOGICAL VOLUME CONFIGURATION TABLE

| LOGICAL VOLUME ID (611) | VOLUME GROUP ID (612) |
|---|---|
| LV_01 | VG_01 |
| LV_02 | VG_01 |
| LV_03 | VG_02 |
| LV_04 | VG_03 |
| ... | ... |

620: LVM VOLUME GROUP CONFIGURATION TABLE

| VOLUME GROUP ID (621) | PHYSICAL VOLUME ID (622) |
|---|---|
| VG_01 | LUN_01 |
| VG_02 | LUN_02 |
| VG_03 | LUN_06 |
| ... | ... |

FIG. 8

120 STORAGE MANAGEMENT TABLE

710 PHYSICAL VOLUME INFORMATION TABLE

| STORAGE DEVICE ID (711) | PHYSICAL VOLUME ID (712) | PERMISSION (713) |
|---|---|---|
| ST_01 | LUN_01 | UNUSABLE |
| ST_01 | LUN_02 | UNUSABLE |
| ST_01 | LUN_03 | UNUSABLE |
| ST_01 | LUN_04 | UNUSABLE |
| ST_01 | LUN_05 | USABLE |
| ST_01 | LUN_06 | UNUSABLE |
| ST_02 | LUN_07 | UNUSABLE |
| ST_02 | LUN_08 | UNUSABLE |
| ... | ... | ... |

720 PAIR INFORMATION TABLE

| PAIR ID (721) | PRIMARY VOLUME ID (722) | COPY TYPE (723) | SECONDARY VOLUME ID (724) |
|---|---|---|---|
| PAIR_01 | LUN_02 | LOCAL | LUN_03 |
| PAIR_02 | LUN_02 | LOCAL | LUN_04 |
| PAIR_03 | LUN_06 | REMOTE | LUN_07 |
| PAIR_04 | LUN_07 | LOCAL | LUN_08 |
| ... | ... | ... | ... |

710: PHYSICAL VOLUME INFORMATION TABLE
720: PAIR INFORMATION TABLE

FIG. 9

900
BACKUP CONFIGURATION SETTING

901 <BACKUP TARGET>

| TARGET APPLICATION | AP_02 |
|---|---|

902 <BACKUP POLICY>

| COPY TYPE | | LOCAL COPY | 903 |
|---|---|---|---|
| GENERATION NUMBER | | 2 | 904 |
| BACKUP SCHEDULE | FREQUENCY | ■ EVERY DAY  □ DAY OF THE WEEK | 905 |
| | TIME | 12 : 00 | 906 |

907 CONSTRUCT    908 CANCEL

BACKUP CONFIGURATION DIAGNOSIS ☒

<BACKUP TARGET>

1301

| TARGET APPLICATION | AP2 |
|---|---|

<BACKUP POLICY>

1302

| COPY TYPE | | LOCAL COPY |
|---|---|---|
| GENERATION NUMBER | | 2 |
| BACKUP SCHEDULE | FREQUENCY | ■ EVERY DAY  ☐ DAY OF THE WEEK |
| | TIME | 12 : 00 |

1303     1304

[DIAGNOSIS]  [CANCEL]

FIG. 15

MANAGEMENT COMPUTER USED TO CONSTRUCT BACKUP CONFIGURATION OF APPLICATION DATA

CROSS-REFERENCE TO RELATED APPLICATIONS

The present application claims a priority from Japanese Patent Application No. 2008-251347 filed on Sep. 29, 2008, the content of which herein incorporated by reference.

BACKGROUND OF THE INVENTION

1. Field of the Invention

The present invention relates to a management computer, and particularly to a management computer used to construct or operate a backup configuration of application data in a computing system.

2. Related Art

In environments such as a data center for a business enterprise and the like, a huge amount of data needs to be processed at high speed. Such environments may employ the following technique to effectively use storage resources. Specifically, a volume group is formed from one or more physical volumes, and one or more logical volumes are created from the volume group. This technique is called a Logical Volume Management (hereinafter called "LVM") function, and for example, can be used on UNIX-like OSs including Linux®. Each of the logical volumes created by the LVM function is allocated an application that uses the logical volume, and operation is performed.

Usually, data stored in a logical volume of a storage by an application is protected from faults, such as a failure of a disk that configures the logical volume, for example, by backup of the data in another logical volume that forms a pair together with the logical volume. Meanwhile, an application operated without a backup at the beginning may require a backup configuration construction after starting operation of the application due to an increase in significance of the application.

In such case, in response to a request for a backup for each application, it is necessary to identify a physical volume used by the application currently operating and to form a pair consisting of a primary volume and a secondary volume for the backup. There is a technique for simplifying the above-mentioned operation by reducing a construction procedure of a backup configuration of an application (for example, described in Japanese Patent Application Laid-open Publication No. 2005-11311). In this technique, a physical volume used by the application is identified from configuration information of the application, and is used as a backup source.

According to the invention disclosed in Japanese Patent Application Laid-open Publication No. 2005-11311, in an environment where a plurality of applications use the same volume group, all of the physical volumes that constitute the volume group used by the application specified for backup configuration construction are used as the backup source. In this case, data of applications other than the specified application also becomes a backup target.

For example, assume that each of the plurality of applications has a different administrator. In this case, when the backup of the specified application is performed with the above-mentioned configuration, an administrator of the other application cannot know that the data managed by the administrator himself/herself has been copied to the secondary volume.

Accordingly, even when the administrator deletes the data on the primary volume side, the backed up data remains on the secondary volume side without the administrator having a chance of knowing such fact. In this case, this leads to a problem that even when, for example, an illegal access or the like is made on the secondary volume side to have the data read, the administrator of the other application may not be able to find the illegal access.

An object of the present invention is to provide a management computer enabling construction of a backup configuration of one particular application data, without influencing data of another application.

SUMMARY OF THE INVENTION

One aspect of the present invention for attaining the above-mentioned and other objects is a management computer coupled to a host computer on which an application operates and to a storage apparatus that includes a plurality of volume groups each having one or more logical volumes, at least one of the logical volumes allocated to the application. The management computer includes: a volume group overlapping use determination part that determines whether there is another logical volume used by another application in a volume group when a pair is formed that uses as a backup source the volume group to which the logical volume used by the application belongs; and a backup policy determination part that determines whether or not there is another volume group for which there is set a backup policy information identical to that set for the application when a pair is formed that uses as a backup source the volume group to which the logical volume used by the application belongs. In the management computer, the pair is formed using the volume group as the backup source when the volume group overlapping use determination part determines that the another logical volume does not exist in the volume group, and the pair is formed using the another volume group as the backup source by migrating the logical volume of the application to the another volume group having the same backup policy information when the volume group overlapping use determination part determines that there is the another application that is using the another logical volume in the volume group, and when the backup policy determination part determines that there is the another volume group to which the logical volume used by the another application having the identical backup policy information belongs.

Other objects and solutions to the problems disclosed by the present application will become apparent from the section of DETAILED DESCRIPTION OF THE INVENTION and the attached drawings.

According to the present invention, it is possible to construct a backup configuration of data of one particular application, without influencing data of another application.

BRIEF DESCRIPTION OF THE DRAWINGS

FIG. 4 is a diagram showing an example of a backup policy table 159;

FIG. 5 is a diagram showing an example of a backup catalog table 160;

FIG. 6 is a diagram showing an example of an application administrator table 161;

FIG. 7 is a diagram showing an example of an application configuration table 137;

FIG. 8 is a diagram showing an example of an LVM configuration table 138;

FIG. 9 is a diagram showing an example of a storage management table 120;

FIG. 11 is a diagram showing an example of a backup configuration setting screen 900;

FIG. 15 is a diagram showing an example of a setting screen 1300 of the backup configuration construction permission diagnostic processing;

DETAILED DESCRIPTION OF THE INVENTION

Figure 1:
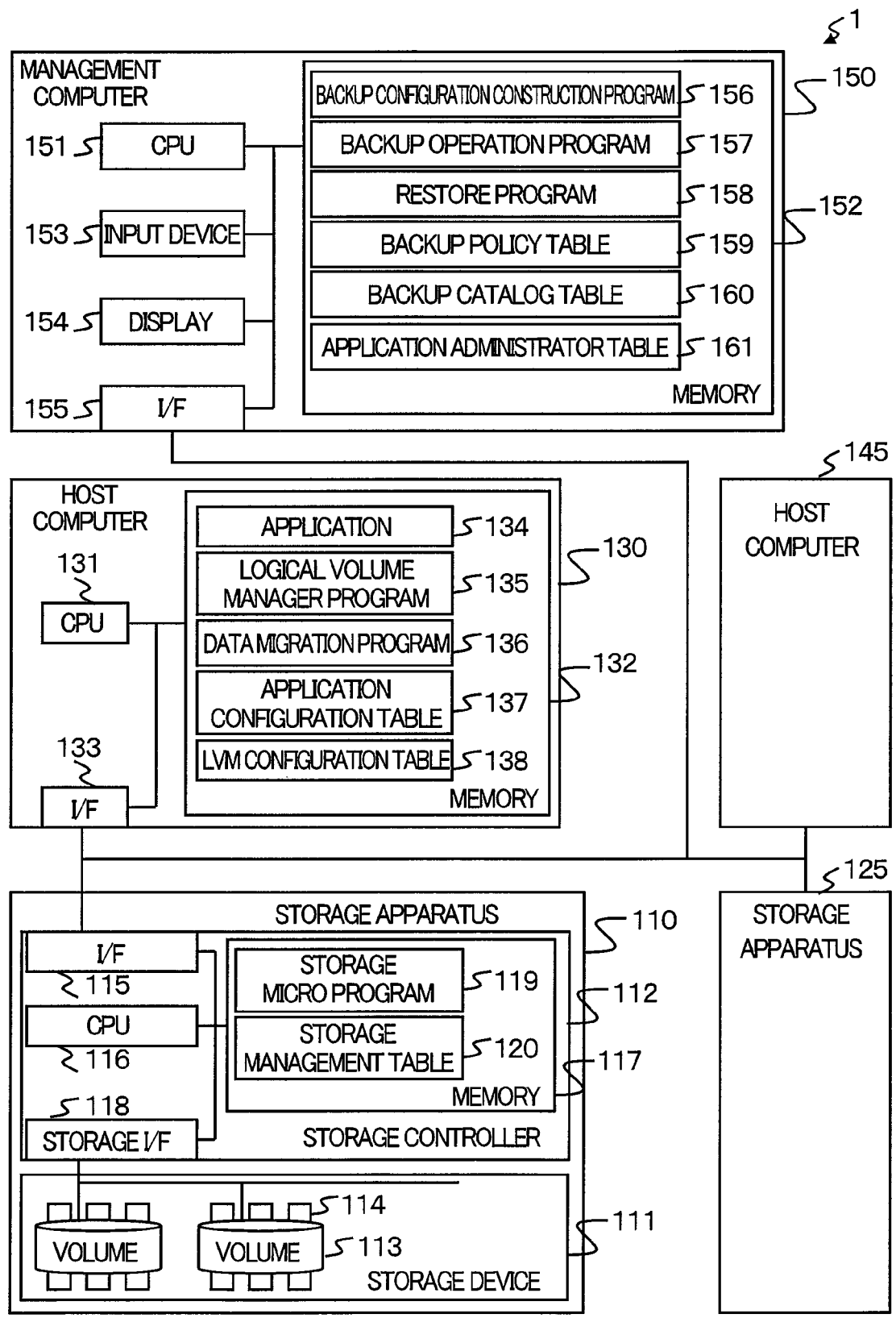
FIG. 1 is a diagram showing an example of a configuration of a computing system 1 according to a first embodiment of the present invention.

Hereinafter, embodiments will be described, referring to the drawings.

First Embodiment

To begin with, a first embodiment of the present invention will be described with reference to FIG. 1 and others. FIG. 1 is a diagram showing a configuration of a computing system according to the first embodiment of the present invention.

As shown in FIG. 1, a computing system 1 of the present embodiment is configured to include a storage apparatus 110, a host computer 130, and a management computer 150. While in addition to the storage apparatus 110, a storage apparatus 125 is coupled in the present embodiment, one storage apparatus or three or more storage apparatuses may be provided. Moreover, with respect to the host computer, two host computers, the host computer 130 and a host computer 145, may be provided as in the present embodiment; or one host computer or three or more host computers may be provided. The computing system 1 can also have a configuration in which the same computer is used for the host computer 130 and the management computer 150.

Through a network, the storage apparatus 110, the host computer 130, and the management computer 150 are coupled by their respective network interfaces (I/F), namely, an I/F 115 of the storage apparatus 110, an I/F 133 of the host computer 130, and an I/F 155 of the management computer 150. This network is a LAN, for example.

The storage apparatus 110 includes a storage device 111 that stores data, and a storage controller 112 that controls the storage apparatus 110. The storage device 111 and the storage controller 112 are coupled to each other through a storage I/F 118.

The storage device 111 is configured to include one or more disks 114 each accommodating a memory area that stores the data actually operated by the computer (for example, host computer 130) The volume 113 is a logical memory area formed of the disk 114. The disk 114 is typically a hard disk drive. The volume 113 is implemented as a volume having a RAID constitution, for example, by use of a plurality of hard disks.

The storage apparatus 110 further has: the I/F 115 that performs transmission/reception of data I/O with respect to data read/write, communication with the management computer 150 and the like; a CPU 116 that controls read/write of the data I/O; and a memory 117.

In the I/F 115, communication devices may be separately disposed for every communication configuration depending on a difference of a communication configuration (for example, IP (Internet Protocol) for communication with the management computer 150, and FC(s) (Fibre Channel) for data I/O with the host computer 130). Even when the same protocol is used, because of a difference in usage or other reasons, the communication devices may be separately disposed for the communication with the management computer 150 and for the communication with the host computer 130.

The memory 117 stores a storage micro program 119 and a storage management table 120 managed by the storage micro program 119. The storage micro program 119 is a program for managing a configuration of the storage device 111. The storage micro program 119 is executed by the CPU 116, to implement a function to create a pair definition for the volume 113, a function to make the host computer 130 recognize the volume 113 via the I/F 115, and the like. The storage management table 120 is a table for managing information used in the storage micro program 119, such as information needed in order to define a pair.

Through the I/F 133, the host computer 130 stores and edits data in the volume 113 of the storage apparatus 110. The host computer 130 includes a CPU 131, a memory 132, and the I/F 133. The CPU 131 is a processor that executes a program stored in the memory 132. The memory 132 stores an application 134, a logical volume manager program 135, a data migration program 136, an application configuration table 137, and an LVM configuration table 138.

The application 134 is a program for executing a task, the program operating on the host computer 130. One or more of the applications 134 are implemented, and each application 134 is managed by an application administrator. The logical volume manager program 135 forms a volume group from one or more volumes 113 of the storage apparatus 110. One or more logical volumes used by each application 134 can be created from the volume group.

The data migration program 136 has a function to migrate a specified file and data stored in a specified memory area of the disk to another memory area. The I/F 133 is coupled to the storage apparatus 110 and the management computer 150 described later. A single I/F 133 is provided when the same protocol is used for the management computer 150 and the storage apparatus 110. Or, in such a case, for example, that Fibre Channel is used for transmission/reception of data to and from the management computer 150 while TCP/IP is used for the storage apparatus 110, I/Fs 133 corresponding to respective cases should be provided.

The management computer 150 is configured to include a CPU 151, a memory 152, an input device 153, a display unit 154, and the I/F 155. The input device 153 is input devices such as a keyboard or a mouse, for example. The display unit 154 is a screen display device such as a CRT, for example. The memory 152 stores a backup configuration construction program 156, a backup operation program 157, a restore program 158, a backup policy table 159, a backup catalog table 160, and an application administrator table 161.

The backup configuration construction program 156 is executed by the CPU 151 to implement processing according to the present embodiment. The backup operation program 157 is a program for performing backup on the basis of a backup schedule after the backup is constructed.

Figure 2:
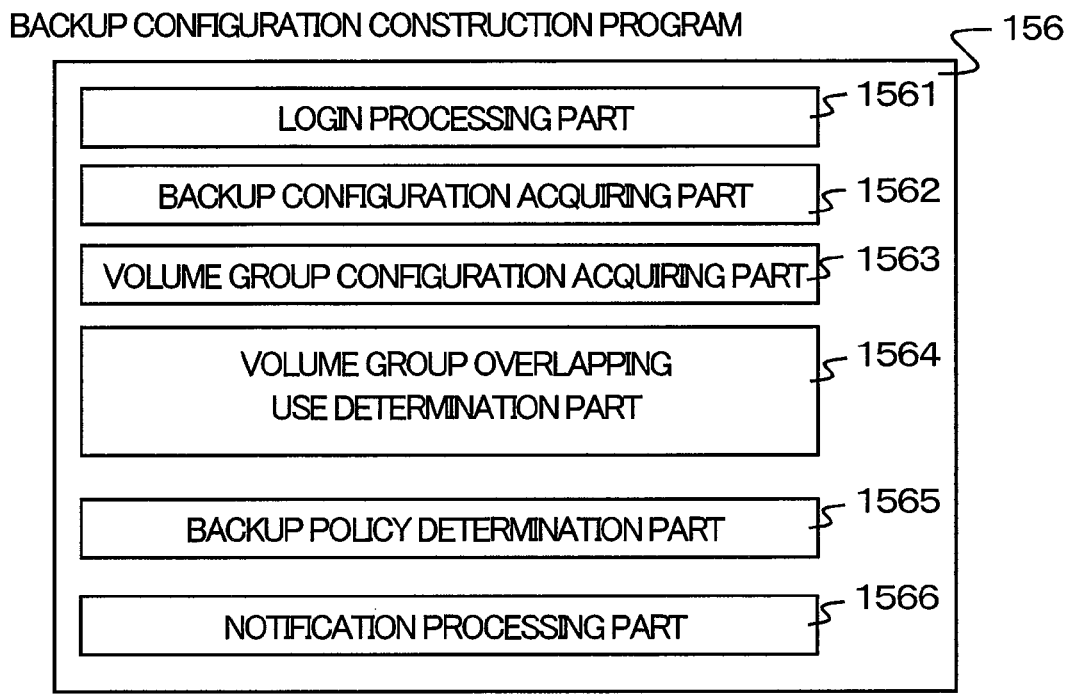
FIG. 2 is a diagram showing an example of a configuration of a backup configuration construction program 156.

Next, the backup configuration construction program 156 in the present embodiment will be described. FIG. 2 shows an example of a functional block of the backup configuration construction program 156. As shown in the drawing, the backup configuration construction program 156 is configured to include a login processing part 1561, a backup configuration acquiring part 1562, a volume group configuration acquiring part 1563, a volume group overlapping use determination part 1564, a backup policy determination part 1565, and a notification processing part 1566. Each of these parts is a functional module that implements a function of the backup configuration construction program 156. As mentioned above, each function is implemented when the backup configuration construction program 156 is read from the memory 152 and is executed by the CPU 151.

The login processing part 1561 acquires login information inputted by an application administrator who attempts construction of a backup configuration, and performs login processing on the application administrator with reference to the application administrator table 161, which will be described later.

The backup configuration acquiring part 1562 acquires various information on a backup configuration set by the application administrator on, for example, a backup configuration setting screen shown in FIG. 11, which will be described later.

Referring to the application configuration table 137, the LVM configuration table 138, and the storage management table 120 described later, the volume group configuration acquiring part 1563 identifies a volume group used by an application that demands for backup configuration construction.

The volume group overlapping use determination part 1564 determines whether another application also is using the volume group used by the application identified by the volume group configuration acquiring part 1563 in an overlapping manner.

The backup policy determination part 1565 compares the information on the backup configuration acquired by the backup configuration acquiring part 1562 with the backup policy table 159 described later, and determines whether there is any other volume group for which the same backup policy is set.

The notification processing part 1566 performs processing of notifying the application administrator of the processed result in the backup configuration construction program 156, such as the determination results of the volume group overlapping use determination part 1564 and the backup policy determination part 1565.

Figure 3:
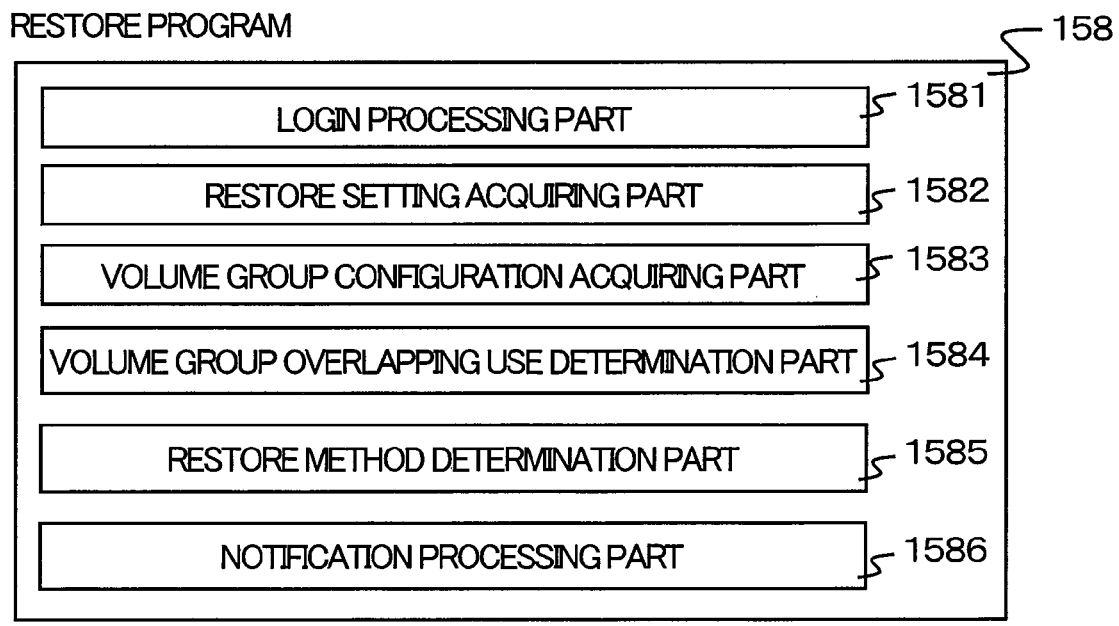
FIG. 3 is a diagram showing an example of a configuration of a restore program 158.

Next, the restore program 158 in the present embodiment will be described. FIG. 3 shows an example of a functional block of the restore program 158. As shown in the drawing, the restore program 158 is configured to include a login processing part 1581, a restore setting acquiring part 1582, a volume group configuration acquiring part 1583, a volume group overlapping use determination part 1584, a restore method acquiring part 1585, and a notification processing part 1586. Similar to the case of the backup configuration construction program 156, each of these parts is a functional module that implements a function of the restore program 158, and each function is implemented when the restore program 158 is read from the memory 152 and is executed by the CPU 151, as mentioned above.

The login processing part 1581 acquires login information inputted by an application administrator who attempts restoring, that is, write back of data to the primary volume from the secondary volume, the primary volume and the secondary volume forming a backup pair. Then, with reference to the application administrator table 161 described later, the login processing part 1581 performs login processing on the application administrator.

The restore setting acquiring part 1582 acquires various information on restoring set by the application administrator on a restore execution screen shown in FIG. 19, which will be described later.

With reference to the application configuration table 137, the LVM configuration table 138, and the storage management table 120, which are described later, the volume group configuration acquiring part 1583 identifies a volume group used by the application that demands to be restored.

The volume group overlapping use determination part 1584 determines whether another application is using the volume group used by the application identified by the volume group configuration acquiring part 1583 in an overlapping manner.

Figure 20:
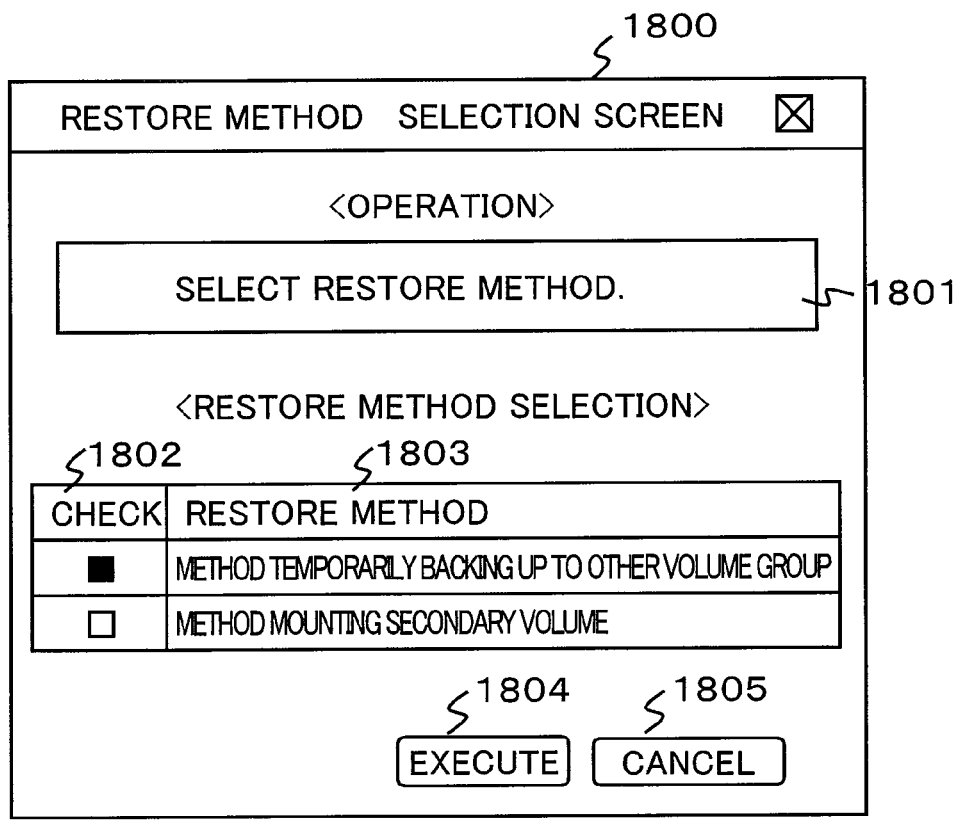
FIG. 20 is a diagram showing an example of a selection screen 1800 of a restore method applied to the restore processing.

The restore method acquiring part 1585 acquires information on a restore method that is inputted by the application administrator using a restore method selection screen 1800 illustrated in FIG. 20. In the present embodiment, as described later, the application administrator selects any one of methods including a "method of backing up the data of another application in a different existing volume group" and a "method of mounting the secondary volume on the host computer."

The notification processing part 1586 performs processing of notifying the application administrator of the result processed in the restore program 158 such as the determination result of the volume group overlapping use determination part 1584.

Each functional module that configures the backup configuration construction program 156 and the restore program 158 described above may be formed as a module in units other than those illustrated. Moreover, it may be so configured that modules having the same or similar function may be shared by two or more programs.

Next, each table referred to in the present embodiment will be described. The backup policy table 159 is referred to by the backup configuration construction program 156 executed on the management computer 150. FIG. 4 shows an example of the backup policy table 159. The backup policy table 159 stores: a volume group ID 201 that is an identification code given to each volume group; a copy type 202 set for each volume group; a pair ID 203 that is an identification code given to a pair of the primary volume and the secondary volume; and a backup schedule 204. When a new volume group is created, a record of the new volume group is added to this backup policy table 159. Details will be given with Step 1411 in FIG. 16 described later.

A column of the copy type 202 stores a type indicating whether local copy or remote copy is executed at the time of backup. The local copy involves copying of data within the same storage apparatus, whereas the remote copy involves copying of data between different storage apparatuses. For example, when the local copy has various types, such as a function to copy all the data of the primary volume, a function to perform differential copy, a function to copy only difference, the type may be presented.

Timing at which the backup data is created is set in a column of the backup schedule 204. Multiple backup schedules may be set for one volume group ID. Moreover, the backup schedule 204 may be specified using not only time, but also day or month.

In the example of FIG. 4, no backup is set for the volume group VG_01. Backup data of two generations is created for the volume group VG_02. As for the volume group VG_03, the backup schedule is of a cascade configuration.

For example, a pair configuration of the volume group VG_03 can be known in accordance with the next procedure. To begin with, the LVM configuration table 138 described later shows that the volume group VG_03 uses a physical volume LUN_06 as the primary volume. The pair ID 203 of the backup policy table 159 of FIG. 4 shows that pairs, PAIR_03 and PAIR_04, are constructed. With reference to a pair information table 720 described later, the physical volume LUN_06 used by the volume group VG_03 is coupled to a physical volume LUN_07 through the remote copy, and the physical volume LUN_07 is coupled to a physical volume LUN_08 through the local copy. This shows that the volume group VG_03 is cascaded. In addition, a relationship between a physical volume ID 712 and a storage device ID 711 of a physical volume information table 710, which will be described later, shows that the physical volume LUN_07 and the physical volume LUN_08 are provided in a storage device ST_02 different from a storage device ST_01 where the physical volume LUN_06 is provided.

Next, the backup catalog table 160 will be described. The backup catalog table 160 is referred to by the backup operation program 157 and the restore program 158, which are executed on the management computer 150. FIG. 5 shows an example of the backup catalog table 160. The backup catalog table 160 stores a backup ID 301, time 302, and a pair ID 303. The backup ID 301 is an identification code allocated for each setting of the backup being set up. The time 302 stores data on the time of the last backup execution. The pair ID 303 is an identification code given to each pair of the primary volume and the secondary volume. Then, IDs of the primary physical volume and the secondary physical volume ID that are used in pairs can be known from reference to the pair information table 720 included in the storage management table 120 described later.

Next, the application administrator table 161 will be described. The application administrator table 161 is referred to by the backup configuration construction program 156 executed on the management computer 150. FIG. 6 shows an example of the application administrator table 161. The application administrator table 161 is formed of an application administrator ID 401, a host ID 402, an application ID 403, and a manageable storage device ID 404.

The application administrator ID 401 is an identification code given to each application administrator who manages an application. The host ID 402 is an identification code given to a host computer to which each application belongs. The application ID 403 is an identification code given to each application.

The manageable storage device ID 404 is an identification code given to a storage device that is set to be manageable by an application administrator. Such management of the manageable storage device ID 404 prevents migration of the data to the volume group including the volume in the storage device that cannot be managed by the application administrator.

Next, the application configuration table 137 will be described. The application configuration table 137 is referred to by the backup configuration construction program 156 executed on the management computer 150. FIG. 7 shows an example of the application configuration table 137. The application configuration table 137 stores an application ID 501 of the application 134 executed on the host computer 130, a logical volume ID 502 of the logical volume used as a memory area by the application, and an ID 503 of a file used by the application. Here, for example, in a case of a mainframe, a range of the disk of the physical volume used by the application is stored instead of the logical volume ID.

Next, the LVM configuration table 138 will be described. The LVM configuration table 138 is referred to by the backup configuration construction program 156 executed on the management computer 150. FIG. 8 shows an example of the LVM configuration table 138. The LVM configuration table 138 includes an LVM logical volume configuration table 610 and an LVM volume group configuration table 620.

The LVM logical volume configuration table 610 stores a logical volume ID 611 of the logical volume that exists in the host computer 130, and a volume group ID 612 to which the logical volume belongs. The LVM volume group configuration table 620 stores a volume group ID 621 of the volume group that exists in the host computer 130, and a physical volume ID 622 of the volume 113 that exists in the storage device 111, the volume 113 forming the volume group. While one physical volume is allocated to one volume group here, two or more physical volumes may be allocated to one volume group.

Next, the storage management table 120 will be described. The storage management table 120 is referred to by the backup configuration construction program 156 executed on the management computer 150. FIG. 9 shows an example of the storage management table 120. The storage management table 120 includes the physical volume information table 710 and the pair information table 720.

The physical volume information table 710 stores an ID 711 of the storage device 111, a physical volume ID 712 corresponding to the logical volume 113 set for the storage device 111, and a permission flag 713 that is a flag for identifying whether the logical volume 113 is usable. In the permission flag 713, "usable" is recorded, for example, for the volume that is used by nothing, i.e., is not currently used. Therefore, the usable volume includes unused volumes as well as the logical volumes that are not used at present while having a use history.

The logical volume with the "usable" flag can be used when the logical volume is allocated to the primary volume at the time of creation of a new volume group, or when the logical volume is allocated as the secondary volume at the time of an instruction to construct a pair. The pair information table 720 stores a pair ID 721, a physical volume ID 722, a copy type 723, and a secondary volume ID 724, the secondary volume ID 724 and the physical volume ID 722 forming a pair.

==Backup Configuration Construction Processing==

Figure 10:
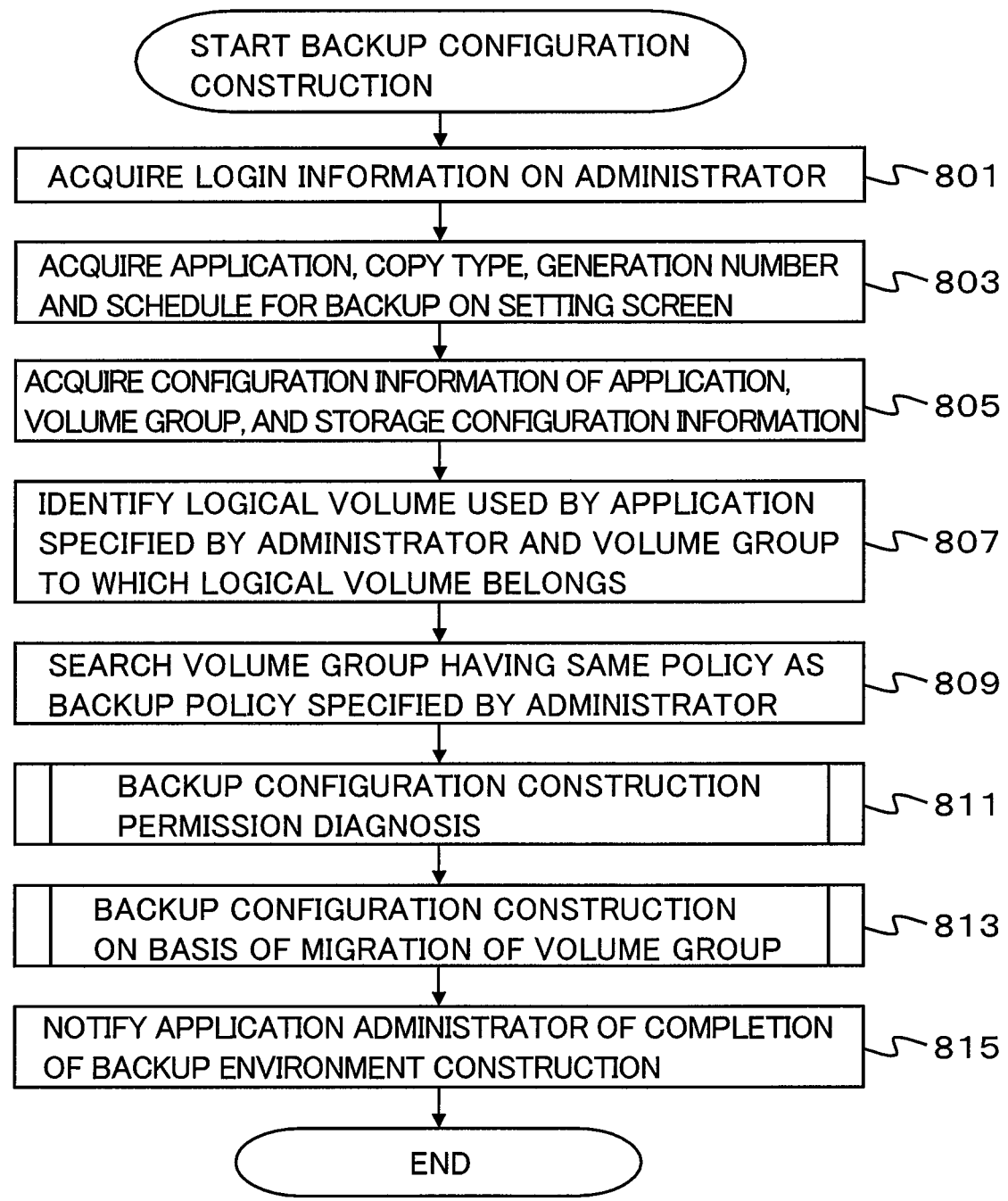
FIG. 10 is a diagram showing an example of a flow chart of a backup configuration construction processing in the first embodiment.

Next, a backup configuration construction processing according to the present embodiment will be described. FIG. 10 is a flow chart showing an example of processing for constructing this backup configuration. In FIG. 10, processing performed in Step 801 through Step 815 is implemented by the backup configuration construction program 156 according to the present embodiment. However, at Step 813, processing by the logical volume manager program 135, the data migration program 136, or the storage micro program 119 of the present embodiment is included.

In either case, a specific configuration in that with which processing step is implemented by which program may be appropriately determined depending on a demand on system design or the like. Needless to say, these processing steps are practically implemented by the CPU reading each program from the memory and executing the steps of each program.

To begin with, by using the login processing part 1561, the management computer 150 acquires information that an application administrator has logged in, and refers to the application administrator ID 401 from the application administrator table 161. Next, upon receipt of a request for construction of the backup configuration from the application administrator, the management computer 150 displays the setting screen of the backup configuration, and starts processing to construct the backup configuration.

FIG. 11 shows an example of the backup configuration setting screen. The screen of FIG. 11 is configured to include a target application 901 specified for the backup configuration construction, a backup policy input table 902, a construction instruction button 907, and a cancel button 908 for stopping and terminating the backup configuration construction processing.

In the column of the target application specification 901, a target application for the backup configuration is specified with the application ID. Further, the backup policy input table 902 includes each column of backup copy type specification 903, generation number specification 904, backup frequency specification 905, and backup time specification 906.

Specified in the column of the copy type specification 903 is the copy type to be executed: the local copy or the remote copy. In the column of the generation number specification 904, the generation number of the backup to be created is specified. In the column of the backup frequency specification 905, frequency at which the backup is executed is specified with a time interval such as every day and once a week, for example. In the column of the backup time specification 906, time when the backup is executed is specified. The management computer 150 acquires the information set on the backup configuration setting screen of FIG. 11 by the application administrator (Step 803).

In the setting screen of FIG. 11, when the construction instruction button 907 is selected, the processing goes to Step 805 to start construction of the backup configuration. Selection of the cancel button 908 terminates the processing, without performing anything. When the construction instruction button 907 is selected, the backup configuration construction program 156 checks whether the administrator who is operating has authority to manage the application inputted into the column of the target application specification 901. This is performed by referring to the application administrator table 161 to check a relationship between the application administrator ID 401 and the application ID 402. When determining that the administrator is not the administrator of the application, the backup configuration construction program 156 notifies the administrator that construction of the backup configuration cannot be performed.

In the example of FIG. 11, it is requested that a configuration should be constructed for an application AP_02 to back up two generations of the local copy at 12:00 every day.

Next, at Step 805, through the backup configuration acquiring part 1562 and the volume group configuration acquiring part 1563, the backup configuration construction program 156 collects, on the management computer 150, information in the application configuration table 137 and the LVM configuration table 138 which are stored in the memory 132 of the host computer 130, and information in the storage management table 120 stored in the memory 117 of the storage apparatus 110.

Next, at Step 807, on the basis of the information acquired at Step 805, the backup configuration construction program 156 causes the volume group overlapping usage determination part 1564 to identify a logical volume used by the application specified at Step 803 and a volume group to which the logical volume belongs.

In the example of FIG. 11, since the AP_02 is specified as the target application 901, the AP_02 is referred to in the application ID 501 of the application configuration table 137 (FIG. 7), which shows that the logical volume ID 502 uses a logical volume LV_02. Next, the logical volume LV_02 is referred to in the logical volume ID 611 of the LVM logical volume configuration table 610 (FIG. 8), which shows that the volume group ID 612 uses a volume group VG_01.

Next, at Step 809, through the backup policy determination part 1565, the backup configuration construction program 156 searches the backup policy table 159 to see if there is any volume group having the same policy as the backup policy acquired at Step 803. While the case of one backup configuration is illustrated in the present embodiment, it is also possible to deal with the backup policy of the volume group having two or more configurations such as a cascade configuration. In this case, whether the configurations are identical to each other is checked by calculating the configuration from the pair ID 203.

At Step 809, the manageable storage device ID 404 is referred to from the application administrator ID 401 of the application administrator table 161. Then, it is determined whether the volume used by the searched-out volume group belongs to the storage device for which the application administrator has administration authority, the application administrator requesting the backup configuration construction. While the volume of the same storage device is used through the local copy in the present embodiment, the administration authority can be likewise checked when the volume of a different storage device is used through the remote copy.

More detailed description will be given using the example of FIG. 11. To begin with, when the backup policy table 159 is referred to, a volume group VG_02 is detected as the volume group coinciding with the backup policy in which the copy type 202 is the local copy, the generation number is two generations, there are two pairs, and the backup schedule 204 is scheduled at 12:00 every day.

Subsequently, the pair ID 203 of the backup policy table 159 shows that the two pairs, PAIR_01 and PAIR_02, exist in the volume group VG_02. The pair information table 720 shows that the physical volumes being used are LUN_02, LUN_03, and LUN_04. Then, the storage device ID 711 is referred to in the physical volume information table 710, which shows that those physical volumes belong to the storage device ST_01.

Since the application administrator table 161 shows that the application administrator P_02 can use the storage devices ST_01 and ST_02, it is determined that the data can be migrated to the volume group VG_02.

The present embodiment is configured to execute a local copy. Accordingly, since the volume exists on the same storage device, checking by the administration authority is not particularly necessary. When it is configured to execute the remote copy, and the volumes exist in different storage devices, it can be determined whether migration is possible by checking whether the application administrator has the administration authority for the physical volumes that form the volume group of a migration destination, in accordance with the same procedure as that mentioned above.

Figure 12:
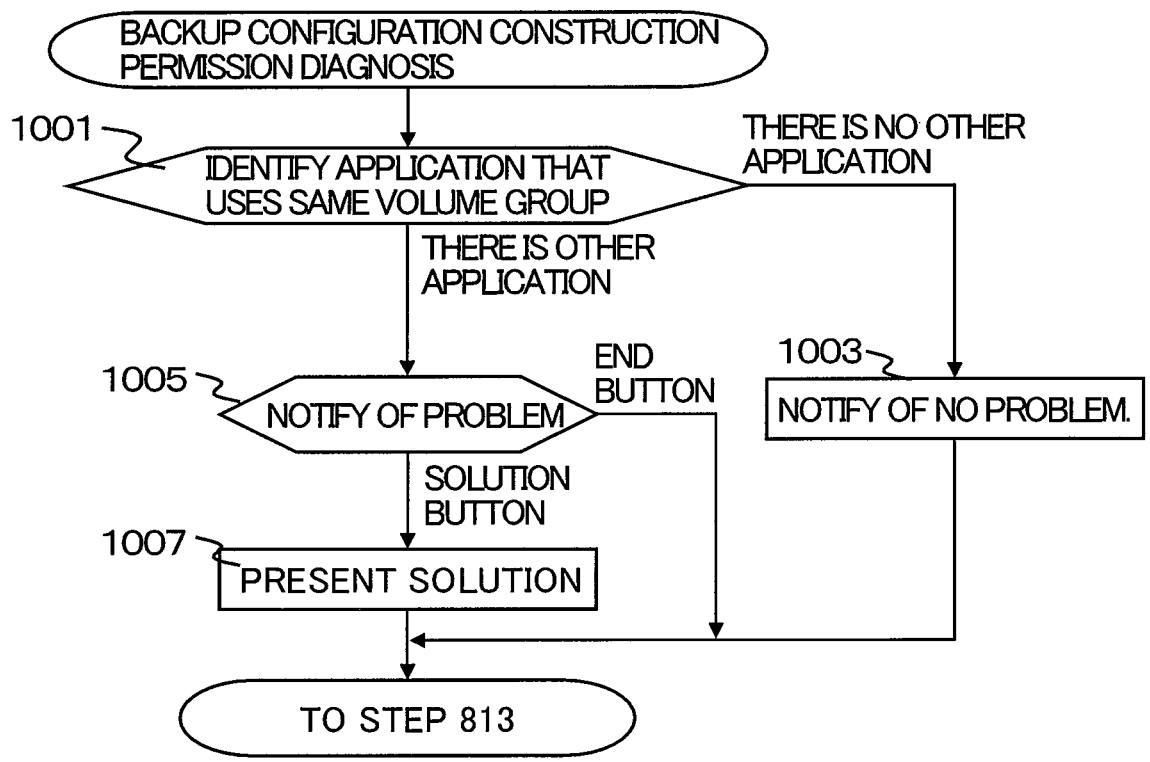
FIG. 12 is a diagram showing an example of a flow chart of a backup configuration construction permission diagnostic processing.

Next, the backup configuration construction program 156 performs a backup configuration construction permission diagnosis (Step 811). FIG. 12 shows an example of a flow of the backup configuration construction permission diagnostic processing.

To begin with, through the volume group overlapping usage determination part 1564, the backup configuration construction program 156 checks whether the volume group in which the specified application exists is shared by another application (Step 1001). The backup configuration construction program 156 checks whether any other logical volume exists in the volume group identified at Step 807, using the LVM logical volume configuration table 610.

When no other logical volume exists, it is determined that no other application that shares the volume group exists. When the other logical volume exists, the application ID 501 is referred to from the logical volume ID 502 of the application configuration table 137 to check whether the application that uses the same volume group exists.

When no other application exists, no other application is influenced by constructing the backup configuration for the specified application. Accordingly, for example, notification of a message saying that there is no problem, such as "specified backup configuration can be constructed" is sent by the notification processing part 1566 to the application administrator (Step 1003). Then, the processing is terminated and goes to construction of Step 813. When another application exists to be influenced by the backup configuration construction, the step goes to processing of Step 1005.

In the example of FIG. 11, as logical volumes belonging to the volume group VG_01, the logical volume LV_01 is detected other than the logical volume LV_02, by referring to the LVM logical volume configuration table 610. Further, it is identified from the application configuration table 137 that the application AP_01 uses the logical volume LV_01. Therefore, it is determined that the data of the other application AP_01 would be also copied together when the backup configuration of the application AP_02 is constructed in this situation.

Figure 13:
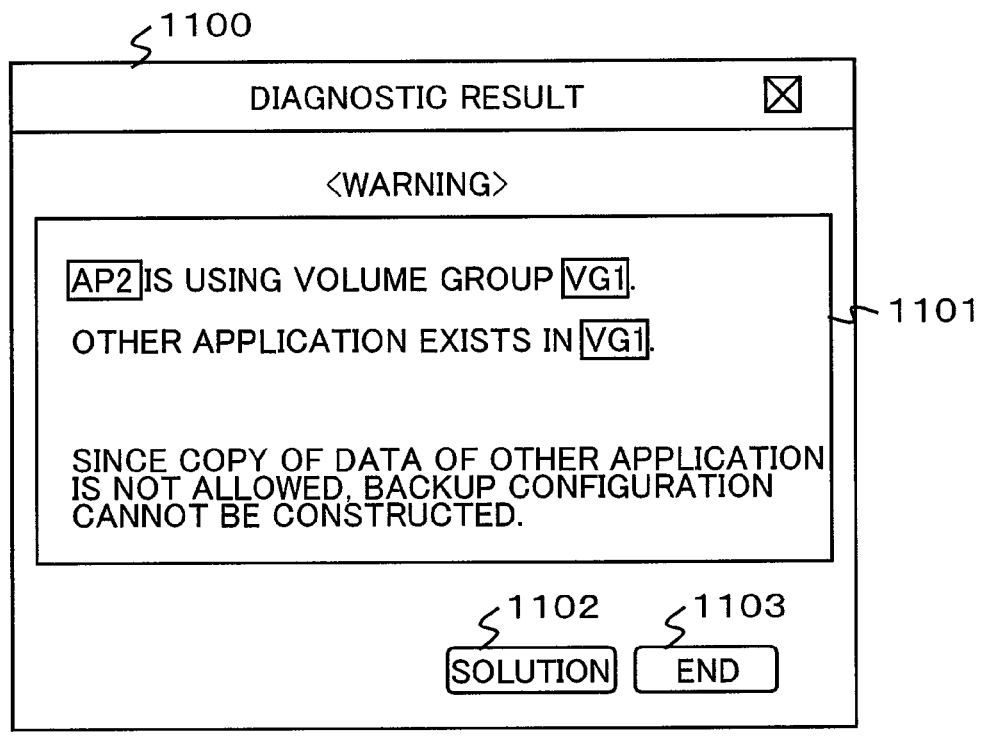
FIG. 13 is a diagram showing an example of a screen 1100 for notification of a warning of a backup configuration construction permission diagnostic result.

Next, at Step 1005, through the notification processing part 1566, the backup configuration construction program 156 notifies the application administrator of the diagnostic result on backup configuration construction permission, which is illustrated, for example, in FIG. 13. FIG. 13 includes a warning column 1101 in which a use state of the volume group, the influence to the other application accompanied with the use state, and the like are described; a solution button 1102 for going to a screen presenting a solution to the warning; and an end button 1103 for terminating the processing.

When the solution button 1102 is selected, the processing goes to Step 1007. In the example of FIG. 13, the warning column 1101 notifies that the application AP_02 is using the volume group VG_01. The warning column 1101 also presents the volume group to which the application AP_02 belongs. Here, the current configuration would cause the data of the other application AP_01 to be copied therewith; accordingly, the warning column 1101 notifies that "the backup configuration cannot be constructed since copy of the data of another application is not allowed."

Figure 14:
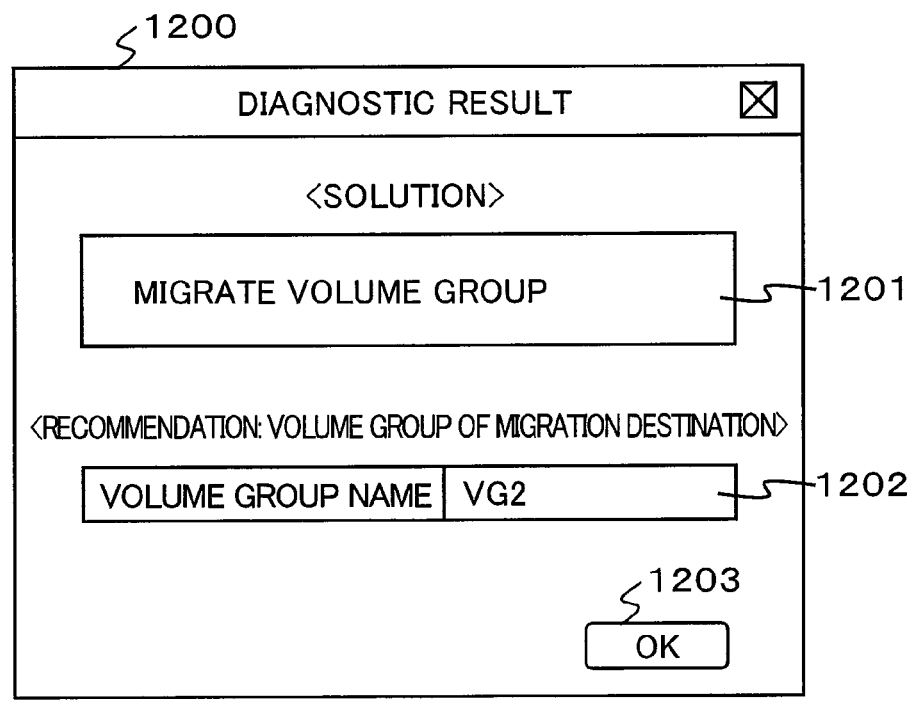
FIG. 14 is a diagram showing an example of a screen 1200 for notification of a solution of the backup configuration construction permission diagnostic result.

Next, at Step 1007, through the notification processing part 1566, the backup configuration construction program 156 displays the solution to the warning shown at Step 1005 on the screen as illustrated, for example, in FIG. 14. The screen of FIG. 14 is configured to include a column 1201 for presenting the solution, a presentation column 1202 of the volume group searched out at Step 809 as having the same backup policy, and an OK button 1203. In FIG. 14, the volume group allowed to migration is presented as the solution. Then, the screen prompts the application administrator to perform migration of the volume group for the specified application. Alternatively, the solution may suggest migration of the data of another application that shares the volume group, considering conditions such as an amount of data to be migrated and communication I/O.

When the OK button 1203 is selected, the processing goes to Step 813 to construct the backup configuration. Alternatively, without constructing the backup configuration, only the diagnostic processing from Step 803 to Step 811 may be executed, and the processing may be terminated. In this case, at Step 803, similar to the case of FIG. 11, an input screen illustrated in FIG. 15 is presented to the application administrator to have the application administrator input into a table of a target application 1301 for which the backup configuration is constructed and into a backup policy table 1302, and select a diagnostic button 1303 with which the processing is started.

While the present embodiment shows an example when the backup configuration is constructed, when the backup configuration is canceled, similar to the present embodiment, the volume group for which the backup configuration is not constructed is searched, and a notification of recommending the application administrator to migrate the data of the application is sent to the application administrator.

Figure 16:
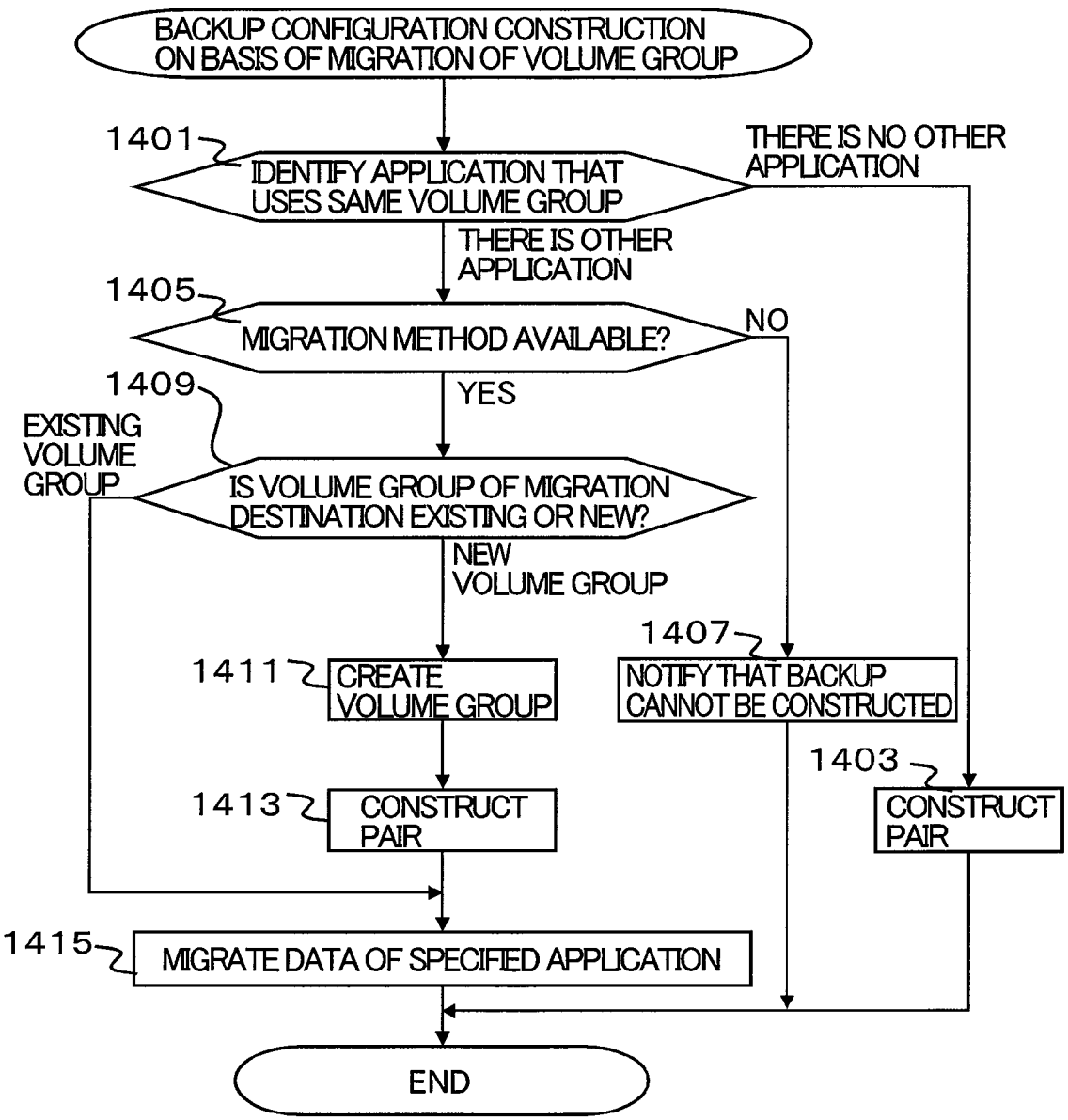
FIG. 16 is a diagram showing an example of a flow chart of a backup configuration construction processing by migrating a volume group.

Next, backup configuration construction based on migration of a volume group is performed (Step 813). FIG. 16 shows an example of a flow of the backup configuration construction processing.

To begin with, at Step 1401, presence of the application that uses the same volume group is identified. This operation is executed in a similar manner to Step 1001 in FIG. 12 mentioned above. When another application that uses the same volume group exists, the processing goes to Step 1405.

When there is no other application that uses the same volume group, a pair is constructed (Step 1403), and the processing is terminated. In order to avoid the influence on the other application at this time, the backup configuration construction program 156 refers to the LVM volume group configuration table 620 to identify a physical volume that forms the volume group being used. The storage micro program 119 stored in the memory 117 of the storage apparatus 110 constructs a pair, using the physical volume as a backup source.

As for the physical volume to be used as the secondary volume, with reference to the physical volume information table 710, the backup configuration construction program 156 detects a "usable" volume (physical volume that is not currently used) from the permission flag 713, and this "usable" volume is allocated as a secondary volume. At this time, information on the newly created pair is added to the pair information table 720. Moreover, information on the pair ID 203 in the backup policy table 159 and information on the permission flag 713 in the physical volume information table 710 are updated.

The backup configuration construction processing will be more specifically described, using the case of FIG. 11 as an example where no other application uses the same volume group.

Since the application AP_02 is using the volume group VG_01, when the LVM volume group configuration table 620 is referred to, the table shows that the physical volume LUN_01 is being used. Next, with reference to the physical volume information table 710, the physical volume LUN_05 that can be used within the same storage device ST_01 is detected. Then, as the pair PAIR_04, the storage micro program 119 constructs a pair in which the physical volume LUN_01 is the primary volume, and the physical volume LUN_05 is the secondary volume. Since the backup generation number is specified to be "2," pair PAIR_05 is constructed in a similar manner.

At this time, "PAIR_04" is added to the pair information table 720 as the pair ID 721. Additionally, "LUN_01" is recorded in the physical volume ID 722, "local copy" is recorded in the copy type 723, and "LUN_05" is recorded in the secondary volume ID 724. With respect to PAIR_05, information is added in a similar manner.

In the backup policy table 159, the record having the volume group ID 201 updating VG_01, by recoding the copy type 202 as "local copy," the backup schedule 204 as "at 12:00 every day," the generation number as "2," and the pair ID 203 as "PAIR_04" and "PAIR_05." In the physical volume information table 710, the permission flag 713 is updated to "unusable" in the record having the physical volume ID 712 of LUN_05. Update is performed also on the physical volume used for the pair PAIR_05 in a similar manner.

Next, at Step 1405, the backup configuration construction program 156 checks whether the data migration program 136 exists on the host computer 130. When the data migration program 136 exists, the processing goes to Step 1409. When the data migration program 136 does not exist, the backup configuration construction program 156 notifies the application administrator that made the request that the requested construction of the backup configuration cannot be performed (Step 1407). Then, the backup configuration construction program 156 sends a notification for prompting the application administrator to manually migrate the volume group, and then, terminates the processing.

Figure 17:
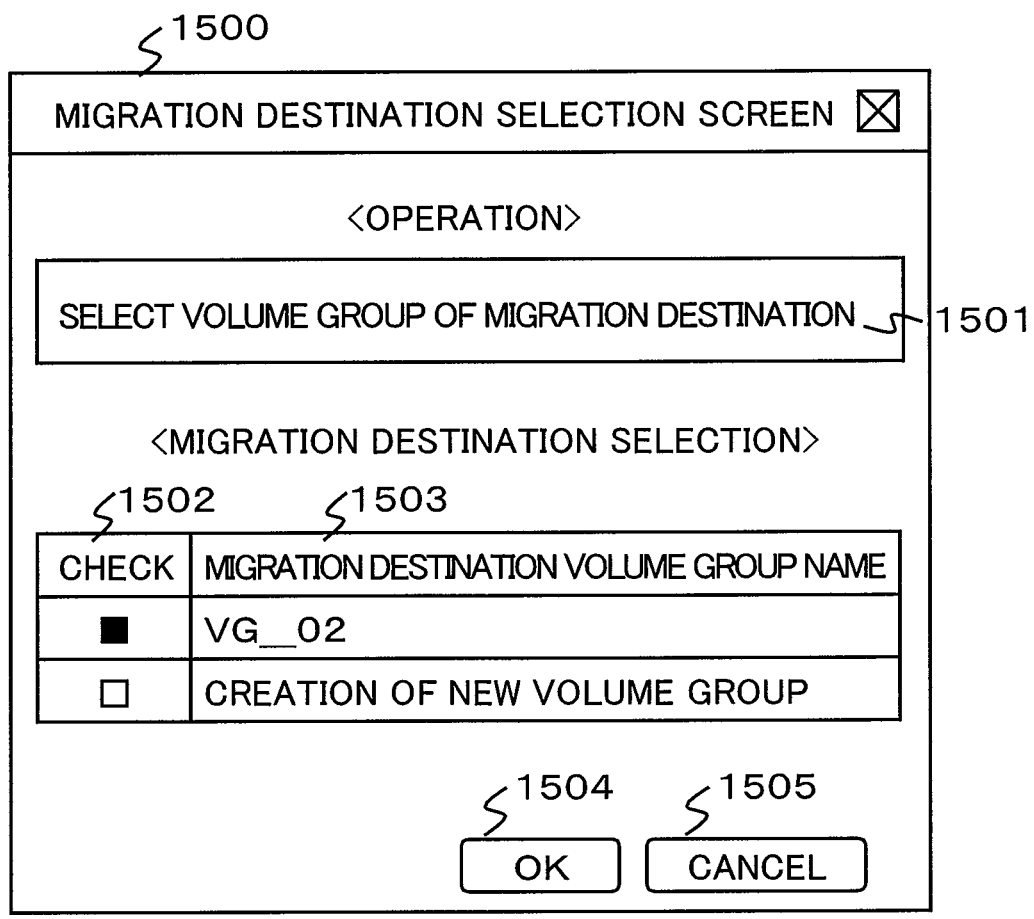
FIG. 17 is a diagram showing an example of a selection screen 1500 of a volume group migration destination.

Next, at Step 1409, the backup configuration construction program 156 acquires information on a migration destination of the volume group, the information inputted by the application administrator by use of a migration destination selection screen illustrated in FIG. 17. When the migration destination is an existing volume group, and therefore a new volume group need not be created, the processing goes to Step 1415. When a new volume group is the migration destination, the processing goes to Step 1411.

The migration destination selection screen illustrated in FIG. 17 is configured to include an operation presentation column 1501, a migration destination selection check column 1502, a volume group name 1503 of the volume group to be used as the migration destination, an OK button 1504, and a cancel button 1505. There are two alternatives displayed at Step 1007: creation of the new volume group and migration to the volume group allowing migration and having the same backup policy. When the volume group of the migration destination is not found, the alternative is only the creation of the new volume group. When the OK button 1504 is selected, the processing goes to the next Step 1411. When the cancel button 1505 is selected, the processing is suspended.

It should be noted that, by incorporating processing for automatically setting the migration destination when the backup configuration construction program 156 detects an appropriate migration destination, Step 1409 can be skipped, at which the application administrator selects the migration destination. In the example of the screen in FIG. 17, selection is made such that the data of the application AP_02 is migrated to the existing volume group VG_02.

At Step 1411, a new volume group is created using the logical volume manager program 135 stored in the memory 132 of the host computer 130. A physical volume recorded as "usable" is detected from the column of the permission flag 713 with reference to the physical volume information table 710, and is allocated to the new volume group as a physical volume to be used in the new volume group. At this time, the information on the new volume group is added to the backup policy table 159 in accordance with the following procedure.

To begin with, since a volume group is to be newly created, an ID which is not the same as any of existing IDs is acquired as the volume group ID 201. The copy type 202 and the backup schedule 204 from the backup policy acquired at Step 801 are recorded. The pair ID to be created at the next step 1413 is filled in the pair ID 203 with reference to the pair information table 720.

Next, at Step 1413, a pair is constructed in accordance with the same processing as that at Step 1403. Here, the physical volume allocated to the volume group created at Step 1411 is used as the backup source.

Next, at Step 1415, the data of the specified application is migrated at a file level, using the data migration program 136 stored in the memory 132 of the host computer 130. Accordingly, only the data of the specified application can be backed up.

Here, a method for migrating data will be described. With reference to the application configuration table 137, the file ID 503 being used is identified from the application ID 501 being used. What is used here is, for example, a file level HSM (Hierarchical Storage Management) function of the server, which is a function to transparently migrate a file from the host.

Alternatively, when, for example, the storage apparatus 110 is a mainframe, the used range of the disk may be stored instead of the used file ID, and a copy function of the storage specifying the range of the disk may be used.

With the above-mentioned processing, the processing of backup configuration construction on the basis of migration of the volume group at Step 813 is terminated.

Finally, at Step 815, the backup configuration construction program 156 on the memory 152 of the management computer 150 notifies the application administrator that the construction of the backup configuration is completed, and a series of the processing is completed.

After the construction of the backup configuration, in order to operate the backup, the backup operation is performed in accordance with the schedule set at the time of backup configuration construction. Here, the backup operation is performed using the backup operation program 157 on the memory 152 of the management computer 150. The backup operation program 157 also allows the application to freeze. While the application is frozen, a pairing status is formed, and the data is copied. For example, processing of a split status and pairing status of the pair is controlled using the micro program 119 of the storage apparatus. When the restore program has a function of pairing operation, the function may be used. Since a backup record is added to the backup catalog table 160 of FIG. 5 every time a backup is performed, the date and time when the data was created and the volume in which the data remains can be easily known.

While an application administrator manages only one application in the present embodiment, the application administrator may manage multiple applications. When multiple applications exist in a same volume group, the application administrator checks "whether to construct the same backup configuration" with respect to all of the applications, and can avoid migrating the volume group. The applications can be searched in accordance with the processing similar to that at Step 803 through Step 811.

==Restore Processing==

Next, restore processing according to the present embodiment will be described with reference to FIG. 1 and others. This restore processing is a method for restoring data of a specified application after the backup configuration is constructed in accordance with the above-mentioned procedure according to the present embodiment. Here, the restore program 158 on the memory 152 of the management computer 150 mainly operates. The restore program 158 implements the restore processing by being read from the memory 152 and executed by the CPU 151. The restore processing in the present embodiment can also be used for recovery when failures such as disk failures occur.

Figure 18:
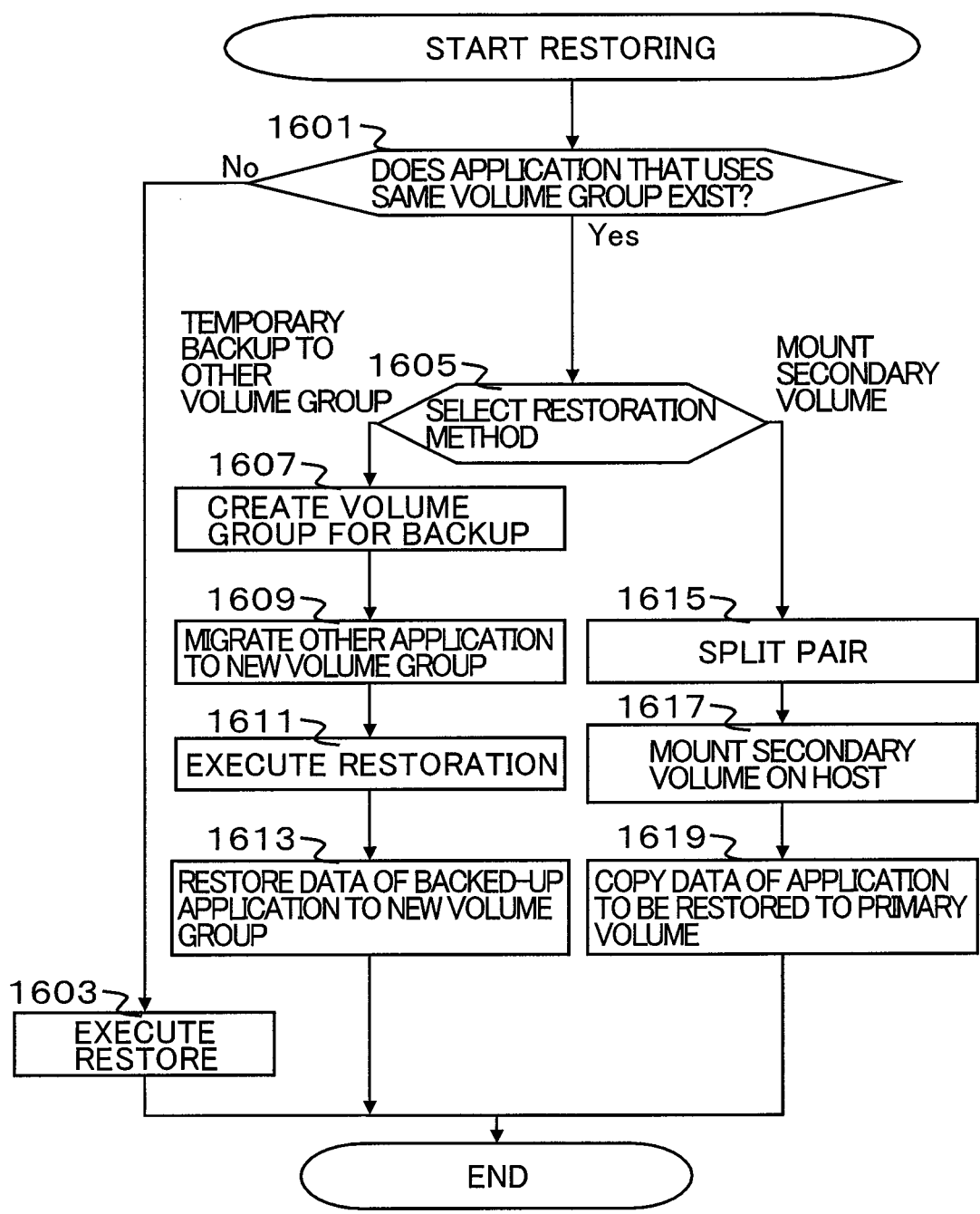
FIG. 18 is a diagram showing an example of a flow chart of a restore processing in the computing system according to the first embodiment of the present invention.

FIG. 18 shows an example of a flow chart of the restore processing. In FIG. 18, Step 1601 to Step 1619 correspond to the steps performed by the restore program 158. However, Step 1607 includes a step performed by the logical volume manager program 135. Step 1609, Step 1613, and Step 1619 include steps performed by the data migration program 136. Similar to the case of the processing of the backup configuration construction, a specific configuration of which processing step is implemented by which program may be appropriately determined depending on a demand on system design or the like.

Figure 19:
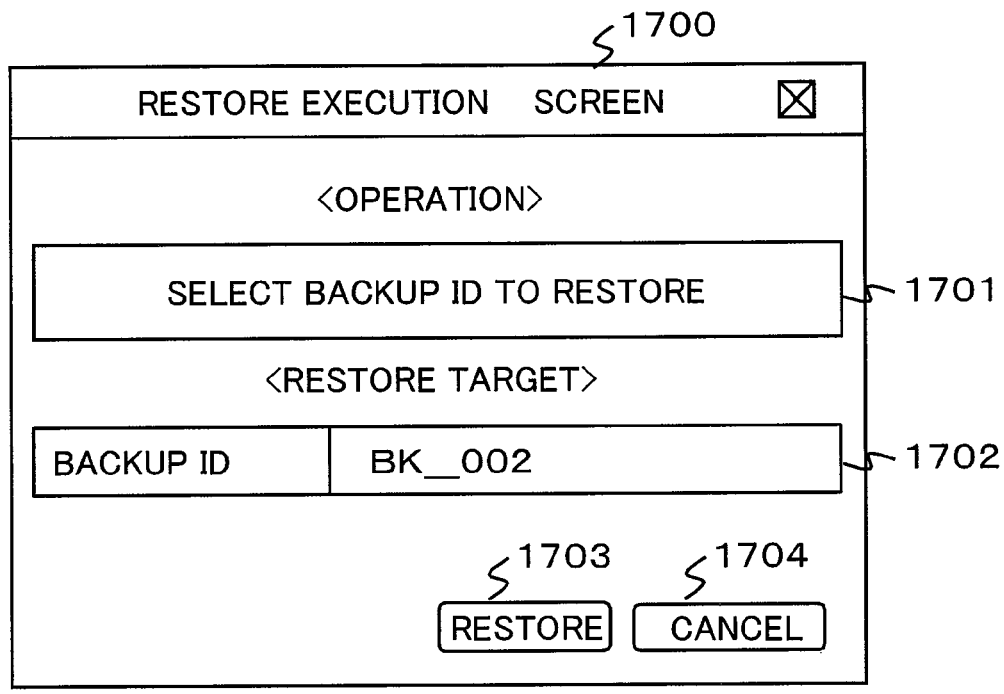
FIG. 19 is a diagram showing an example of a restore processing setting screen 1700.

To begin with, the restore program 158 on the management computer 150 uses the backup ID 1702 inputted by the application administrator through the restore execution screen illustrated in FIG. 19 to identify a target volume to restore, and starts the restore processing. At this time, similar to Step 1001 in the processing flow of FIG. 12, the restore program 158 identifies whether there is any application that uses the same volume group as that used by the application specified to be restored (Step 1601).

When there is no other application that uses the same volume group, the processing goes to Step 1603. When there is another application that uses the same volume group, the processing goes to Step 1605. As shown in FIG. 19, the restore execution screen 1700 is configured to include an operation presentation column 1701, a backup ID 1702 of a restore target, a restore button 1703, and a cancel button 1704. The application administrator selects the backup ID 301 to restore with reference to the date and time 302 and the pair ID 303 of the data in the backup catalog table 160. At this time, the pair ID 303 is used to acquire the physical volume ID 722 of the primary volume and the physical volume ID 724 of the secondary volume in the pair information table 720. Accordingly, specifying the backup ID 1702 allows identification of the secondary volume to be restored.

The backup ID 1702 of the restore target is BK_002 in the example of FIG. 19. It is therefore identified that the pair ID 303 is PAIR_02 from the backup catalog table 160. The pair ID 721 is referred to in the pair information table 720. Thereby, the secondary volume ID 724 in which the backup data is stored is identified as LUN_04.

Next, at Step 1603, since there is no influence on the other application, the restore program 158 on the management computer 150 executes restoring to write back the data of the specified secondary volume to the primary volume, and completes the processing.

On the other hand, at Step 1605, information on the restore method is acquired, the restore method being inputted by the application administrator through a restore method selection screen 1800 illustrated in FIG. 20. As shown in FIG. 20, the restore method selection screen 1800 is configured to include an operation presentation column 1801, a restore method selection check column 1802, restore methods 1803, an execute button 1804, and a cancel button 1805.

Two types of restore methods are employed for the present embodiment as an example. The two types are: a method of temporarily backing up the data of the other application, which will be influenced by the restoring, to another volume group, and a method of mounting the secondary volume of the backup destination on another host and using the secondary volume. When the method of temporarily backing up the data to other volume group is selected, the processing goes to Step 1607. When the method of mounting the secondary volume on another host is selected, the processing goes to Step 1615.

In the restore method selection screen 1800, when a desired restore method is selected through the restore method selection check column 1802, and then the execution button 1804 is operated, the processing goes to the next step which, in the example of FIG. 18, is Step 1607.

To begin with, the method of temporarily backing up the data of another application to another volume group will be described with reference to Step 1607 to Step 1613 in FIG. 18. At Step 1607, a volume group for temporary backup is created using the logical volume manager program 135 on the memory 132 of the host computer 130. At this time, a usable volume is detected with reference to the physical volume information table 710 included in the storage management table 120 of the storage controller 112 to use the volume for the volume group for temporary backup.

At Step 1609, using the data migration program 136 on the host computer 130, the data of another application other than the application specified to be restored is migrated to the volume group for temporary backup created at Step 1607. The migration method is the same as that of Step 1415 in FIG. 16 concerning the processing of backup configuration construction.

At Step 1611, using the restore program 158, the secondary volume of a restoring source is identified from the backup catalog table 160 in a similar manner to Step 1603, and the restore processing is performed on the original volume.

At Step 1613, the data of the other application temporarily backed up is restored to the volume group after the restore processing, by using the data migration program 136. Then, the volume group for temporary backup which is no longer necessary is deleted using the logical volume manager program 135.

Next, the method of mounting the secondary volume on another host will be described with reference to Step 1615 to Step 1619 in FIG. 18. At Step 1615, the secondary volume in which the data of the restore source exists is identified from the backup catalog table 160, using the storage micro program 119 on the storage apparatus 110. When the pair is not split, the pair is split.

At Step 1617, the identified secondary volume, which is the backup destination, is mounted on the host computer (for example, host computer 130) using the restore program 158. At Step 1619, the data of the application specified to be restored is copied to the primary volume via the host, using the restore program 158. Finally, the secondary volume is unmounted to return to the original pairing status.

When the backup configuration is newly constructed for the data of the application for which the backup configuration is not constructed, only the data of the application desired to be restored can be restored by performing the above-mentioned processing. In addition, the backup data is not generated in the new secondary volume immediately after a backup configuration change processing is performed on the volume during backup operation. In this case, in the similar manner to Step 1603, the location where the backup data is stored is identified.

Since restoring is needed in the volume group before migration, it is necessary to perform processing similar to that from Step 1607 to Step 1611, and to perform processing to migrate only the data of the application specified from the volume group after restoring and before migration to the volume group after migration. The application backedup from the volume group before migration is returned. Accordingly, restoring of the application immediately after backup configuration change can also be implemented.

Second Embodiment

Next, a second embodiment of the present invention will be described. The present embodiment is different from the first embodiment in that, the present embodiment employs a computing system configuration with a virtual server applied in the computing system of the first embodiment. In the present embodiment, description will be given of a case where the present invention is applied to construct a backup configuration of a virtual server, and differences from the configuration of FIG. 1 will be mainly described.

Figure 21:
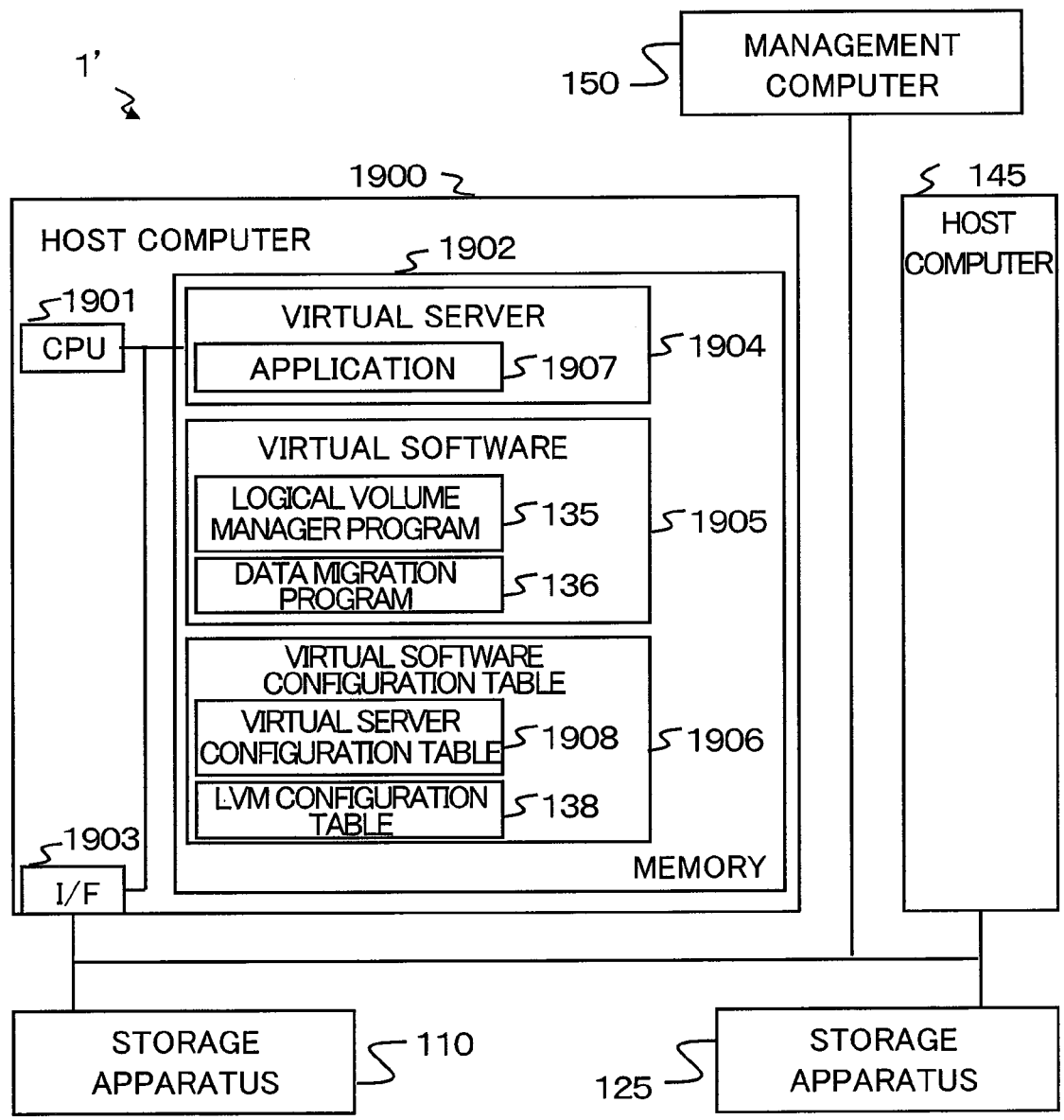
FIG. 21 is a diagram showing an example of a configuration of a computing system 1' according to a second embodiment of the present invention.

FIG. 21 shows a system configuration diagram of a computer system 1' including a virtual server according to the present embodiment. A host computer 1900 is configured to include a CPU 1901, a memory 1902, and an I/F 1903. The memory 1902 stores a virtual server 1904, virtual software 1905, and a virtual software configuration table 1906. The application 134 of the first embodiment corresponds to the virtual server 1904 of the present embodiment.

An application 1907 is operated on the virtual server 1904. The application 1907 is a program that executes a task that operates on the virtual server 1904. A single application or multiple applications may exist in a single virtual server 1904.

The virtual software 1905 has functions of the logical volume manager program 135 and the data migration program 136 in the first embodiment. Accordingly, the virtual software 1905 can create a volume group from one or more volumes 113, and can create multiple logical volumes from the volume group. One or more virtual servers can be allocated to the logical volume. The virtual software 1905 also has a function to migrate data used by the virtual server 1904.

The virtual software configuration table 1906 includes a virtual server configuration table 1908 and information of the LVM configuration table 138 in the first embodiment.

Next, a description will be given of various information used for the processing of backup configuration construction according to the present embodiment by explaining differences from the information recorded on each table from FIG. 2 to FIG. 7 in the first embodiment.

In the application administrator table 161 of FIG. 6 managed on the management computer 150, a virtual server administrator ID of an administrator managing the virtual server 1904 is recorded instead of the application administrator ID 401. The application configuration table 137 of FIG. 7 is used as a virtual server configuration table 1908. In this case, a virtual server ID 501 is recorded instead of the application ID 501. The logical volume ID 502 and the used file ID 503 are the logical volume ID and file ID that are used by the virtual server 1904.

A procedure of backup configuration construction in the present embodiment can be implemented in a similar manner to the case of the first embodiment by replacing the configurations of the first embodiment with the configurations of the present embodiment that correspond to those of the first embodiment as mentioned above. In this case, the administrator who requests construction of the backup configuration becomes the virtual server administrator.

Since the virtual software 1905 manages the virtual server configuration table 1908, migration of data in the virtual server 1904 for which backup configuration construction is demanded can be processed in the similar manner to the case of the first embodiment.

The text in FIGS. 10 to 20 is to be read with the term application replaced with virtual server. Accordingly, while the information on the target application is acquired as the backup target at Step 803 of FIG. 10 in the first embodiment, the information on the target virtual server specified by the virtual server administrator is acquired in the present embodiment.

The application may be specified as the backup target, when the administrator of the virtual server is identical to the administrator of the application mounted in the virtual server, the virtual server and the application have a one-to-one correspondence, and a relationship between the virtual server and the application is identifiable by, for example, using a setting by the administrator, or recognition by a program.

In some cases, such as when testing the virtual server, an identical image of a virtual server made by cloning is used. For example, when the volume is newly allocated to the duplicated virtual server, the backup configuration construction program 156 of the management computer 150 promotes construction of a same configuration as the backup configuration of the virtual server of a duplication source.

Specifically, the virtualization software 1905 performs the cloning. The backup configuration construction program 156 acquires the event, and issues a warning in the warning column 1101 of FIG. 13, for example, informing "backup configuration is constructed for a virtual server of the duplicating source." The virtual software 1905 executes the cloning. The virtualization software 1905 may receive the event that took place and send the event to the backup configuration construction program 156 on the management computer 150, and then, may issue a notification, or vice versa.

Only by replacing the configuration, the restore processing corresponding to the present embodiment can be implemented in a similar manner to the case of the first embodiment. In this case, the virtual server configuration table 1908 is used instead of the application configuration table 137 used in the first embodiment.

Third Embodiment

Figure 22:
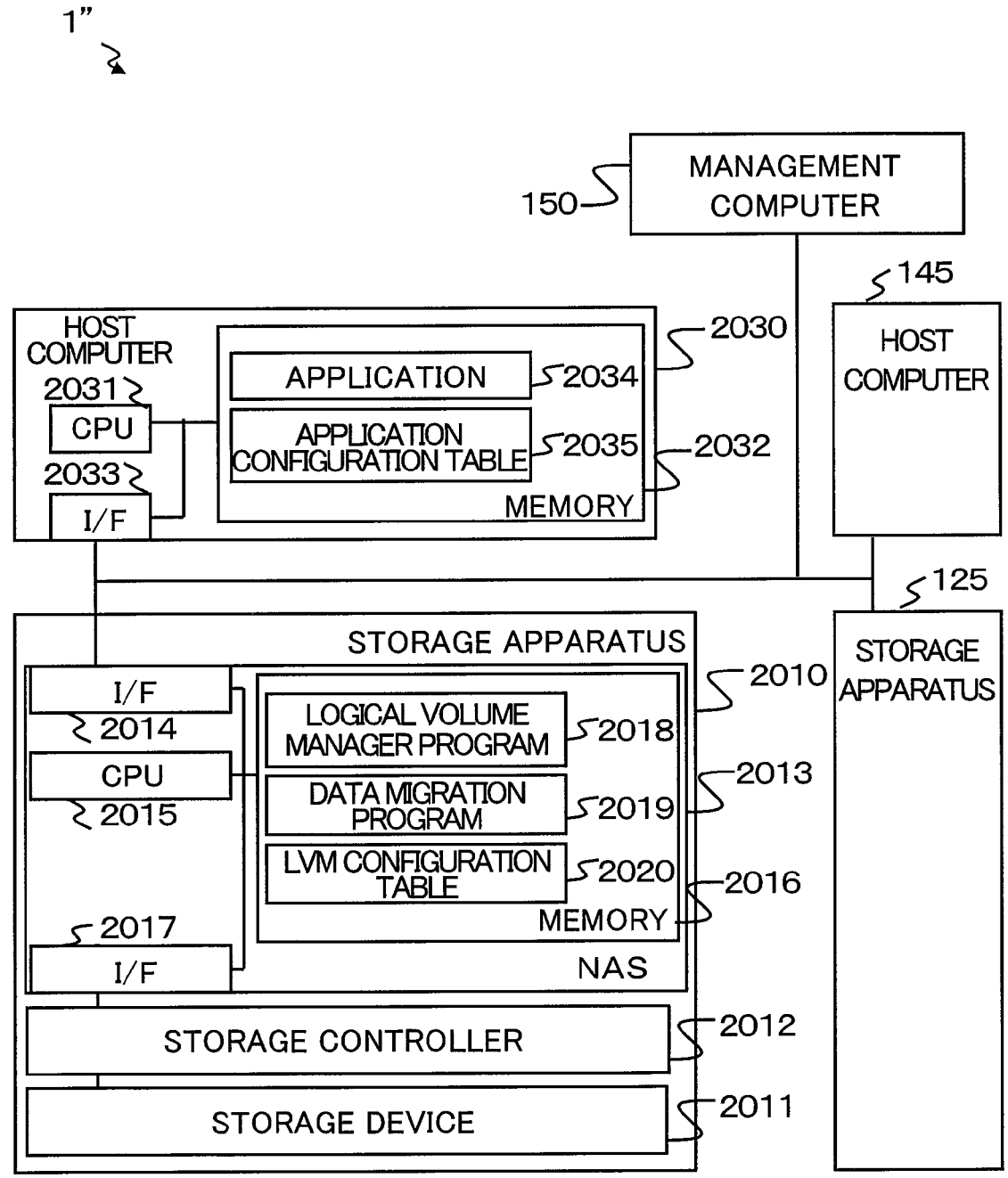
FIG. 22 is a diagram showing an example of a configuration of a computing system 1" according to a third embodiment of the present invention.

Next, a third embodiment of the present invention will be described. The present embodiment employs a computer system configuration that is applied an NAS, in the configuration of the first embodiment shown in FIG. 1. FIG. 22 shows an example of a configuration of a computer system 1" in the present embodiment. In the NAS environment, a storage apparatus 2010 functions as a file server that can refer to its own logical volume through a network from a host computer 2030. The logical volume is used to store the data of an application 2034 operated on the host computer 2030.

Hereinafter, differences from the first embodiment will be explained on backup configuration construction of an application, employing the NAS environment, according to the present embodiment.

In the storage apparatus 2010 of the present embodiment, an NAS 2013 is mounted in addition to a storage device 2011 and a storage controller 2012.

The NAS 2013 is configured to include an I/F 2014 coupled to the host computer 2030 through the network, a CPU 2015, a memory 2016, and an I/F 2017 coupled to the storage controller 2012. The memory 2016 stores a logical volume manager program 2018, a data migration program 2019, and an LVM configuration table 2020, which existed on the host computer 130 in the first embodiment. The logical volume manager program 2018 and the data migration program 2019 implement their functions by being read and executed by the CPU 2015.

The logical volume manager program 2018 forms a volume group using one or more volumes of the storage device 2011, and creates one or more logical volumes from the volume group. The logical volume manager program 2018 can make the logical volume appear as, for example, a disk drive to the host computer 2030, and data can be stored in the logical volume.

As is similar to the case of the first embodiment, the data migration program 2019 identifies a used logical volume and a used file from an application configuration table 2035, and migrates data in a specified file range.

The memory 2032 on the host computer 2030 stores the application 2034 and the application configuration table 2035. Various information used in the present embodiment is the same as the information recorded in each table shown in FIG. 4 to FIG. 9 in the first embodiment.

A procedure of backup configuration construction in the present embodiment can be implemented in the similar manner to the case of the first embodiment by replacing the configurations as mentioned above. That is, the similar flow charts and examples of the screen, which are shown in FIGS. 10 to 17 in the first embodiment, can be used for the present invention.

The logical volume manager program 2018 and the data migration program 2019 exist on the NAS 2013 of the storage apparatus 2010 in the present embodiment while the logical volume manager program and the data migration program exist on the host computer 130 in the first embodiment. Accordingly, the apparatus targeted for the operation by the management computer 150 is changed from the host computer 2030 to the storage apparatus 2010. Similarly, the LVM configuration table, which is on the host computer 130 in the first embodiment, exists on the NAS 2013 of the storage apparatus 2010 in the present embodiment. Accordingly, the acquisition source of the information at Step 805 in the flow chart of FIG. 10 is different from that in the present embodiment.

The backup configuration construction program 156 on the management computer 150 collects, on the management computer 150, information in the application configuration table 2035 on the host computer 2030, information in the LVM configuration table 2020 on the NAS 2013 of the storage apparatus 2010, and information in the storage management table 120 on the storage controller 2012.

Only by replacing the components as shown in FIG. 22, the restore processing in the present embodiment can be implemented, using the processing shown from FIG. 18 to FIG. 20 in the similar manner to the case of the second embodiment.

However, in the present embodiment, the logical volume manager program 2018 and the data migration program 2019 exist on the storage apparatus 2010. Accordingly, the operation target of the backup configuration construction program 156 on the management computer 150 is the storage apparatus 2010. Similarly, the LVM configuration table 2020 is acquired from the NAS 2013 of the storage apparatus 2010.

What is claimed is:

1. A management computer for a computer system, the computer system including a storage apparatus and a host computer on which a virtual server operates, the storage apparatus including a plurality of physical volumes, wherein data is copied between the physical volumes according to a pair definition, and the host computer forming a volume group from a physical volume, of the plurality of physical volumes, to create a logical volume for the virtual server, wherein the volume group is a set of volumes that is a target of a backup, said management computer comprising:
   a memory storing a management program; and
   a CPU (Central Processing Unit) executing the management program to:
   (A) acquire an identifier (ID) of a backup target virtual server, and acquire backup policy information of the backup target virtual server,
   (B) identify a first logical volume used by the backup target virtual server,
   (C) identify a first volume group to which the first logical volume belongs,
   (D) determine whether or not a second volume group exists, the second volume group having a same backup policy as the acquired backup policy information, wherein data of a second physical volume from which the second volume group is formed, is copied to a first physical volume forming a pair with the second physical volume according to the same backup policy,
   (E) determine whether or not a first another virtual server exists, the first another virtual server using a second logical volume in the first volume group, and
   (F) if the first another virtual server of (E) and the second volume group of (D) exist, migrate the first logical volume from the first volume group the second volume group,
   wherein a backup policy for all virtual servers using logical volumes belonging to a volume group is applied to the volume group.

2. The management computer according to claim 1, wherein the CPU further executes the management program to output information indicating that a pair can be formed to copy data from a first physical volume from which the first volume group is formed, if the first another virtual server of (E) does not exist.

3. The management computer according to claim 1, wherein the CPU further executes the management program to construct a backup configuration for the backup target virtual server, due to the first another virtual server, if the first another virtual server of (E) exists.

4. The management computer according to claim 1, wherein the backup target virtual server is administered by a first administrator, and the first another virtual server is administered by a second administrator, the second administrator being different from the first administrator.

5. The management computer according to claim 1, wherein the CPU of the management computer further executes the management program to:
   (G) acquire an ID of a restore target virtual server, the restore target virtual server using a third logical volume in a certain volume group, the certain volume group being the first volume group or the second volume group;
(H) form a third volume group from a third physical volume;
(I) migrate data of a second another virtual server to the third volume group, the second another virtual server being a virtual server other than the restore target virtual server, and the second another virtual server using a logical volume in the certain volume group; and
(J) restore data of the certain volume group from the data that is copied between the physical volumes according to the pair definition.

6. A method executed by a management computer for a computer system, the computer system including a storage apparatus and a host computer on which a virtual server operates, the storage apparatus including a plurality of physical volumes, wherein data is copied between the physical volumes according to a pair definition, and the host computer forming a volume group from a physical volume, of the plurality of physical volumes, to create a logical volume for the virtual server, wherein the volume group is a set of volumes that is a target of a backup, and wherein said management computer includes a memory storing a management program, and a CPU (Central Processing Unit) executing the management program, said method comprising:
(A) acquiring an identifier (ID) of a backup target virtual server, and acquiring backup policy information of the backup target virtual server;
(B) identifying a first logical volume used by the backup target virtual server;
(C) identifying a first volume group to which the first logical volume belongs;
(D) determining whether or not a second volume group exists, the second volume group having a same backup policy as the acquired backup policy information, wherein data of a second physical volume from which the second volume group is formed, is copied to a first physical volume forming a pair with the second physical volume according to the same backup policy;
(E) determining whether or not a first another virtual server exists, the first another virtual server using a second logical volume in the first volume group; and
(F) if the first another virtual server of (E) and the second volume group of (D) exist, migrating the first logical volume from the first volume group to the second volume group,
wherein a backup policy for all virtual servers using logical volumes belonging to a volume group is applied to the volume group.

7. The method according to claim 6, further comprising:
(G) outputting information indicating that a pair can be formed to copy data from a first physical volume from which the first volume group is formed, if the first another virtual server of (E) does not exist.

8. The method according to claim 6, further comprising:
(G) constructing a backup configuration for the backup target virtual server, due to the first another virtual server, if the first another virtual server of (E) exists.

9. The method according to claim 6, further comprising:
(G) administering the backup target virtual server by a first administrator, and administering the first another virtual server by a second administrator, the second administrator being different from the first administrator.

10. The method according to claim 6, further comprising:
(G) acquiring an ID of a restore target virtual server, the restore target virtual server using a third logical volume in a certain volume group, the certain volume group being the first volume group or the second volume group;
(H) forming a third volume group from a third physical volume;
(I) migrating data of a second another virtual server to the third volume group, the second another virtual server being a virtual server other than the restore target virtual server, and the second another virtual server using a logical volume in the certain volume group; and
(J) restoring data of the certain volume group from the data that is copied between the physical volumes according to the pair definition.

11. A computer program product comprising:
a management program which causes a management computer for a computer system to execute processing, the computer system including a storage apparatus and a host computer on which a virtual server operates, the storage apparatus including a plurality of physical volumes, wherein data is copied between the physical volumes according to a pair definition, and the host computer forming a volume group from a physical volume, of the plurality of physical volumes, to create a logical volume for the virtual server,
wherein the volume group is a set of volumes that is a target of a backup; and
a non-transitory computer-readable storage medium having the management program tangibly embodied thereon,
wherein the management program causes the management computer to perform the steps of:
(A) acquiring an identifier (ID) of a backup target virtual server, and acquiring backup policy information of the backup target virtual server;
(B) identifying a first logical volume used by the backup target virtual server;
(C) identifying a first volume group to which the first logical volume belongs;
(D) determining whether or not a second volume group exists, the second volume group having a same backup policy as the acquired backup policy information, wherein data of a second physical volume from which the second volume group is formed, is copied to a first physical volume forming a pair with the second physical volume according to the same backup policy;
(E) determining whether or not a first another virtual server exists, the first another virtual server using a second logical volume in the first volume group; and
(F) if the first another virtual server of (E) and the second volume group of (D) exist, migrating the first logical volume from the first volume group to the second volume group,
wherein a backup policy for all virtual servers using logical volumes belonging to a volume group is applied to the volume group.

12. The computer program product according to claim 11, wherein the management program causes the management computer to further perform the step of:
(G) outputting information indicating that a pair can be formed to copy data from a first physical volume from which the first volume group is formed, if the first another virtual server of (E) does not exist.

13. The computer program product according to claim 11, wherein the management program causes the management computer to further perform the step of:

(G) constructing a backup configuration for the backup target virtual server, due to the first another virtual server, if the first another virtual server of (E) exists.

14. The computer program product according to claim 11, wherein the management program causes the management computer to further perform the step of:
   (G) administering the backup target virtual server by a first administrator, and administering the first another virtual server by a second administrator, the second administrator being different from the first administrator.

15. The computer program product according to claim 11, wherein the management program causes the management computer to further perform the steps of:
   (G) acquiring an ID of a restore target virtual server, which uses a third logical volume in a certain volume group, the certain volume group being the first volume group or the second volume group;
   (H) forming a third volume group from a third physical volume;
   (I) migrating data of a second another virtual server to the third volume group, the second another virtual server being a virtual server other than the restore target virtual server, and the second another virtual server using a logical volume in the certain volume group; and
   (J) restoring data of the certain volume group from the data that is copied between the physical volumes according to the pair definition.

\* \* \* \* \*